United States Patent

[11] 3,622,362

| [72] | Inventors | Charles H. Coney;<br>Thomas J. Thompson; Chester A. Bruner, all of Kingsport, Tenn. |
|---|---|---|
| [21] | Appl. No. | 766,001 |
| [22] | Filed | Oct. 8, 1968 |
| [45] | Patented | Nov. 23, 1971 |
| [73] | Assignee | Eastman Kodak Company<br>Rochester, N.Y. |

[54] ALCOHOL SOLUBLE CELLULOSE PROPIONATE ESTER
3 Claims, No Drawings

[52] U.S. Cl. .................................................. 106/169,
106/26, 106/189, 106/193, 260/227, 260/230
[51] Int. Cl. .................................................. C08b,
C09j 3/04
[50] Field of Search .......................................... 106/26,
169, 189, 196, 193; 260/13–17, 227, 230, 224

[56] References Cited
UNITED STATES PATENTS

| 2,265,218 | 12/1941 | Stone | 260/230 |
| 2,883,350 | 4/1959 | Baudecroux | 106/189 X |

*Primary Examiner*—Joan B. Evans
*Attorneys*—William T. French and Donald W. Spurrell ABSTRACT: Cellulose propionate compositions having a propionyl content of from about 37 to about 44 percent by weight, a free hydroxylcontent from about 3.5 to about 8 percent by weight and an ASTM D–1343 viscosity of from about 0.02 to about 50 seconds, have been found to be soluble in hydrous ethanol at 70° F. These compositions are especially useful in ink formulations.

ALCOHOL SOLUBLE CELLULOSE PROPIONATE ESTER

This invention concerns new alcohol soluble cellulose propionate ester compositions and their preparation.

The preparation of cellulose propionate, both the triester and certain hydrolyzed propionates, have been known for some time. Dreyfuss and Schneider describe the preparation in U.S. Pat. No. 1,824,877. In their work they prepared a cellulose propionate and described its solubility in a series of solvents. Their material was soluble in hot ethanol, but insoluble in cold hydrous ethanol, that is, 70° F. ethanol. A later patent, U.S. Pat. No. 2,076,555, describes a cellulose propionate soluble in a series of solvents including a mixture of 62 percent acetone, 21 percent butyl acetate, and 17 percent ethyl alcohol. The primary solvent for these esters was acetone and the esters were insoluble in benzene. It is recognized in the art that cellulose propionate esters are not soluble in cold alcohol, that is, 70° F. ethanol.

In the printing of essentially nonpermeable, nonporous webs, plastic films and metal foils, a fast evaporating solvent system is very desirable in order that the printed ink may be dried in the short time allowed during the printing process. Low molecular weight alcohols such as ethyl alcohol are most desirable in flexographic and gravure printing processes because they not only evaporate rapidly but also have little or no effect on rubber rolls. In fact, flexographic printing is limited to only alcohols or high alcohol content solvent systems.

Several film forming polymers are available which have sufficient alcohol solubility to serve as the pigment binding portion of flexo inks. Two typical resins are nitrocellulose and polyamide. The novel, alcohol soluble, propionic acid ester of cellulose described herein has several distinct and desirable advantages over these typical resins and over other resins known to be employed in the printing ink field.

Objects of the present invention are to provide cellulose propionate compositions soluble in certain ethanol based solvents and having certain characteristics such as: solubility in certain cold hydrous ethyl alcohol; particular suitability for application in flexographic and other types of printing inks; odorless resins useful in printing inks, overprints, and coating lacquers; enhanced adhesion to treated polyethylene, treated polypropylene, and other plastic substrates; and capability of producing a high degree of surface gloss when serving as the principal film former in pigmented compositions.

These and other objects hereinafter appearing have been attained in accordance with the present invention through the discovery that certain cellulose propionate compositions are soluble in certain cold mixtures of ethanol and water and can be prepared from cellulose propionate by a certain hydrolysis procedure hereinafter described in detail. The cold ethanol/water weight proportion ranges from about 3/100 to about 20/100. These novel cellulose propionates are also soluble in conventional cellulose esters solvents such as acetone, ethyl acetate, methyl ethyl ketone, and the ethylene and diethylene glycol ethers and ether acetates, and blends of these with other solvents or nonsolvents.

The cellulose propionate which can be hydrolyzed according to the present invention may be prepared by the propionation of cellulose by conventional procedures to give a propionyl group content of from about 46 to about 50 percent by weight as measured by ASTM D–817–62, Sections 20–27. The propionation is essentially complete, with possibly insignificant amounts of sulfate, or other acyl groups present such as acetyl, butyryl or benzoyl, which may enter the esterfication reaction as impurities in the commercial reactants.

The various sources of cellulosic materials which may be employed in the present invention include cotton and wood pulp. A discussion of cellulose is found in *High Polymers*, Vol. 5, Chapters 1–3 of Emil Ott, Harold M. Spurlin and Mildred W. Grafflin Interscience Publishers, 1954, Second Edition, wherein it is specifically defined as comprising at least 700 anhydroglucose units, specifically anhydroglucose-pyranose units.

A typical preparation of cellulose propionate involves slurrying acetylation grade wood pulp in water for activation, and centrifuging to give a water/cellulose weight proportion of from about 1/2 to 5/1. Other proportions can, of course, be employed, as well as the undried mill cellulose. The wet cellulose is then dewatered by suitable means such as replacement by propionic acid. This step is preferred since water would impede the subsequent esterification by reaction with the propionic anhydride.

The dewatered cellulose is then charged to an acylation mixer, preferably provided with cooling means to prevent uncontrolled cellulose degradation during esterification. Propionic anhydride, preferably cold, in excess is added to the acylation mixer along with propionic acid and dry sulfuric acid catalyst. The propionic acid serves, among other purposes, as a convenient reaction medium. The acylation reaction is initiated by addition of the sulfuric acid catalyst last, or by addition of all reactants at the same time. The temperature is preferably kept below about 150° F. Reaction time for essentially complete propionation depends, of course, on reaction conditions including reactant concentrations. From about 4 to about 6 hours would be considered an adequate reaction time.

The hydrolysis may be carried out by known methods including either acid or basic hydrolysis. A preferred acid hydrolysis involves the use of sulfuric acid catalyst, and aqueous propionic acid (90 percent acid) to prevent ester precipitation, in an agitated vessel at temperatures not exceeding about 200° F. The hydrolysis must be carefully regulated to give a propionyl content of from about 37 to about 44 percent by weight, and a free-hydroxyl content of from about 3.5 to about 8.0 percent by weight. A hydrolysis time of from about 18 to about 24 hours has been found adequate at temperatures of from about 125° F. to about 200° F. The hydrolysis time required, however, is dependent upon such factors as temperature, acid concentration, sulfuric acid catalyst concentration, and the like. The hydroxyl content is measured by ASTM D–817–62, Sections 28–33, and the propionyl content as stated above.

The solution viscosity of these cellulose propionate compositions can vary between about 0.02 and about 50 seconds as measured by ASTM D–1343, but preferably between about 0.02 to about 5.0 seconds, and particularly from about 0.02 to about 1.5 seconds, and is determined by the molecular weight change during esterification The invention will be further illustrated by the following examples.

EXAMPLE 1

One hundred parts of cotton linters was slurried in 3000 parts of water and then centrifuged to a content of about one part of water per part of cellulose, by weight. The cellulose mass was then essentially dewatered by spraying propionic acid into the centrifuge until the acid wet cellulose contained about one part of acid and 0.01 to 0.03 part of water per part cellulose.

The dewatered cellulose was charged to a jacketed acylation mixer to which cold propionic anhydride had previously been added. The reaction mass, having an initial temperature of about 50° F. was of the following composition:

| Component | Parts by Weight |
|---|---|
| Cellulose (dry weight) | 1.00 |
| Propionic Acid | 2.00 |
| Propionic Anhydride | 3.40 |
| Sulfuric Acid | 0.03 |

After initiating the reaction, the mass acylated rapidly and smoothly. The temperature was controlled by jacket cooling and not allowed to rise over 150° F. In 4 to 6 hours, a smooth, completely reacted tripropionate ester of the desired viscosity was obtained.

The anhydride was then reacted with 7 parts aqueous propionic acid (90 percent acid) to obtain a hydrous media for hydrolysis. The mass was hydrolyzed in an agitated vessel at temperatures not exceeding 200° F. for 18-24 hours. The analysis of this material was 1.10 sec. ASTM D-1343 viscosity, 38.3 percent propionyl, and 5.34 percent OH.

EXAMPLE 2

Same procedure was used as in example 1 except that the hydrolysis was stopped such that the analysis of the ester was 0.09 sec. ASTM D-1343 viscosity, 37.9 percent propionyl, and 6.2 percent OH.

EXAMPLE 3

Same procedure as example 1 giving an ester with analysis of 0.5 sec. ASTM D-1343 viscosity, 41.7 percent propionyl, and 4.4 percent OH.

EXAMPLE 4

Same procedure as example 1 giving an ester with analysis of 0.5 sec. ASTM D-1343 viscosity, 41.7 percent propionyl, and 4.4percent OH.

EXAMPLE 5

Same procedure as example 1 giving an ester with analysis of 0.60 sec. ASTM D-1343 viscosity, 42.4 percent propionyl, and 3.54 percent OH. This ester was not soluble in ethyl alcohol.

EXAMPLE 6

A thermoplastic flexographic printing ink was prepared by dissolving 27.9 parts of a 60/40 two-roll mill chip dispersion of chrome yellow pigment/cellulose propionate resin, as prepared in example 4 and having a propionyl content of 29.2 percent, a hydroxyl content of 5.4 percent, and an ASTM D-1343 viscosity of 0.14; 2.4 parts of sucrose acetate isobutyrate (SAIB); and 9.7 parts of an acrylic copolymer resin consisting of 80 percent ethyl methacrylate and 20 percent methyl acrylate in 54 parts of 95 percent proprietary, denatured ethyl alcohol, and then adding six parts of 2-nitropropane. This ink was printed without further dilution on a flexographic press to yield a printed surface with a medium gloss. Good adhesion was obtained on a treated polypropylene, vinylidene chloride coated cellophane, polystyrene, clay coated paper, and heat-shrinkable vinylidene chloride films.

EXAMPLE 7

Example 6 was repeated except that 8.3 parts of a phenolic resin (Durez 12687 a copolymer of about 8/92 hexamethylene tetramine/resoroinol) was substituted for the 9.7 parts of acrylic resin. A very glossy print was obtained from this ink (60° gloss meter reading of 83) and adhesions to treated polyethylene and treated polypropylene were excellent.

EXAMPLE 8

A thermosetting type flexographic and gravure ink was prepared by dissolving 30.3 parts of a 60/40 dispersion of chrome yellow pigment/cellulose propionate resin, said resin having a propionyl content of 39.2 percent, hydroxyl content of 5.4 percent, and an ASTM D-1343 viscosity of 0.14, in a mixture of 2.7 parts of SAIB, 43.6 parts of anhydrous, denatured ethyl alcohol and 4.9 parts of ethyl acetate. After complete solution was obtained, 0.6 parts of p-toluene sulfonic acid was added as a catalyst. This ink, having a viscosity of 190 centipoise, was printed flexographically on treated polyethylene and polypropylene and cured for 5 seconds at 300° F. The resulting print was glossy, had good adhesion to both surfaces, and was insoluble in acetone, methyl ethyl ketone, ethyl acetate, and toluene during a 24-hour period of contact.

EXAMPLE 9

A clear, flexographic overprint was prepared by dissolving 20 parts of the cellulose propionate having a propionyl content of 39.2 percent, hydroxyl content of 5.4, and an ASTM D-1343 viscosity of 0.14 in 80 parts of 95 percent ethyl alcohol. This overprint was applied to a paperboard with a flexographic press and a glossy, protective finish was obtained.

A typical composition range for printing ink utilizing an alcohol-soluble cellulose propionate resin is:

| Component | Parts by Weight |
|---|---|
| Cold Hydrous Ethanol Soluble Cellulose Propionate Resin | 1 |
| | up to 40 |
| Solvent (cold ethanol containing 5% water) | to 99 |
| Pigment or Dye | up to 50 |

Among the modifying resins useful in ink formulations may be mentioned urea-formaldehyde, melamine-formaldehyde, acrylics, polyvinyl acetate, polyesters, polyamides, phenolics, natural such as wood rosins and resins, and epoxides. The higher solvent contents are, of course, required for the higher resin solids content.

Cellulose propionates having a propionyl content of 38-42 percent, a hydroxyl content of from 4-8 percent, ASTM D-1343 viscosities from 0.05 to 2 seconds are particularly useful in ink formation.

Among the various useful pigments or dyes may be mentioned are $TiO_2$, carbon black, the various metal compound pigments such as cadmium sulfide, zinc oxide, zinc sulfide, chromium oxide, iron oxide, selenium sulfide, the organic colorants such phthalocyanines, pyrozolones, quinacridones, alizarines and rhodamines.

The treated polyethylene and polypropylene films referred to above are those rendered more receptive to organic based inks and coatings by exposure of the polyolefin surface to corona discharge, oxidizing flame, or halogenated organic liquids such as ethylene chloride.

This invention has been described in detail with particular reference to specific embodiments thereof, and it will be understood that variations and modifications can be effected within the spirit and scope of the invention as described hereinabove and as defined in the appended claims.

We claim:

1. Cellulose propionate characterized by being soluble in hydrous ethanol at 70° F. having a propionyl content of from about 37 percent to about 44 percent by weight, a free hydroxyl content from about 4.4 percent to about 8 percent by weight, and an ASTM D-1343 viscosity of from about 0.02 to about 50 seconds, wherein the cellulose propionate is substantially free of significant amounts of acetyl which may be present in said cellulose propionate as an impurity.

2. The composition of claim 1 wherein the ASTM D-1343 viscosity is between about 0.02 and about 5.0 seconds.

3. The composition of claim 1 wherein the ASTM D-1343 viscosity is between about 0.02 and 1.5 seconds.

* * * * *

UNITED STATES PATENT OFFICE

CERTIFICATE OF CORRECTION

Patent No. 3,622,362  Dated November 23, 1971

Inventor(s) Charles H. Coney, Thomas J. Thompson and Chester A. Bruner

It is certified that error appears in the above-identified patent and that said Letters Patent are hereby corrected as shown below:

Column 1, line 20, delete "toils" and insert ---foils---.

Column 3, line 34, delete "29.2" and insert ---39.2---.

Column 4, lines 15 and 16, delete "Pigment or Dye".

Column 4, line 22, before the word "Resin" insert ---Modifying---.

Column 4, line 23, before "to 99" insert ---0.3---.

Signed and sealed this 10th day of October 1972.

(SEAL)
Attest:

EDWARD M. FLETCHER, JR.   ROBERT GOTTSCHALK
Attesting Officer          Commissioner of Patents